(12) United States Patent
Kuroda

(10) Patent No.: US 12,311,909 B2
(45) Date of Patent: May 27, 2025

(54) APPARATUS AND METHOD FOR STEERING ADJUSTMENT

(71) Applicant: TOYOTA JIDOSHA KABUSHIKI KAISHA, Toyota (JP)

(72) Inventor: Ryusuke Kuroda, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 201 days.

(21) Appl. No.: 18/343,004

(22) Filed: Jun. 28, 2023

(65) Prior Publication Data

US 2024/0059269 A1 Feb. 22, 2024

(30) Foreign Application Priority Data

Aug. 22, 2022 (JP) .................. 2022-131888

(51) Int. Cl.
*B60W 10/20* (2006.01)
*B60W 30/09* (2012.01)
(Continued)

(52) U.S. Cl.
CPC ............ *B60W 10/20* (2013.01); *B60W 30/09* (2013.01); *B60W 30/0956* (2013.01); (Continued)

(58) Field of Classification Search
CPC .. B60W 10/20; B60W 30/09; B60W 30/0956; B60W 50/087; B60W 50/12; B60W 50/16; B60W 60/001; B60W 60/0055; B60W 2050/0073; B60W 2420/403; B60W 2540/18; B60W 2540/225; B60W 2554/4041; B60W 2554/801; B62D 6/00; B62D 15/025; G06V 20/58; G06V 20/597; G06V 40/161; G06V 40/18
See application file for complete search history.

(56) References Cited

U.S. PATENT DOCUMENTS 5,913,375 A * 6/1999 Nishikawa ............... B62D 6/00
701/28
2016/0280235 A1* 9/2016 Sugaiwa ............... G05D 1/0061
(Continued)

FOREIGN PATENT DOCUMENTS

JP 09-066853 A 3/1997
JP 2016-175614 A 10/2016
(Continued)

Primary Examiner — Phutthiwat Wongwian
Assistant Examiner — Susan E Scharpf
(74) Attorney, Agent, or Firm — Sughrue Mion, PLLC

(57) ABSTRACT

An apparatus for steering adjustment detects a gaze direction of a driver of a vehicle from a facial image in which a face of the driver is represented. During autonomous driving in which steering of the vehicle is autonomously controlled, when an operation by the driver on a steering wheel is detected, determines whether the gaze direction of the driver corresponds to the steering direction in the operation of the driver. The apparatus adjusts a reaction force with respect to the operation of the steering wheel smaller when the gaze direction corresponds to the steering direction than when the gaze direction does not correspond to the steering direction.

5 Claims, 4 Drawing Sheets

(51) Int. Cl.
*B60W 30/095* (2012.01)
*B60W 50/00* (2006.01)
*B60W 50/08* (2020.01)
*B60W 50/12* (2012.01)
*B60W 50/16* (2020.01)
*B60W 60/00* (2020.01)
*B62D 6/00* (2006.01)
*B62D 15/02* (2006.01)
*G06V 20/58* (2022.01)
*G06V 20/59* (2022.01)
*G06V 40/16* (2022.01)
*G06V 40/18* (2022.01)

(52) U.S. Cl.
CPC .......... *B60W 50/087* (2013.01); *B60W 50/12* (2013.01); *B60W 50/16* (2013.01); *B60W 60/001* (2020.02); *B60W 60/0055* (2020.02); *B62D 6/00* (2013.01); *B62D 15/025* (2013.01); *G06V 20/58* (2022.01); *G06V 20/597* (2022.01); *G06V 40/161* (2022.01); *G06V 40/18* (2022.01); *B60W 2050/0073* (2013.01); *B60W 2420/403* (2013.01); *B60W 2540/18* (2013.01); *B60W 2540/225* (2020.02); *B60W 2554/4041* (2020.02); *B60W 2554/801* (2020.02)

(56) References Cited

U.S. PATENT DOCUMENTS

| | | | |
|---|---|---|---|
| 2017/0036673 A1* | 2/2017 | Lee | A61B 5/18 |
| 2017/0197656 A1* | 7/2017 | Oh | B62D 6/008 |
| 2018/0086338 A1 | 3/2018 | Yamada et al. | |
| 2018/0326992 A1* | 11/2018 | Aoi | B60W 50/08 |
| 2019/0077455 A1* | 3/2019 | Park | B62D 1/18 |
| 2020/0039584 A1* | 2/2020 | Igarashi | B62D 1/286 |
| 2020/0231182 A1* | 7/2020 | Oba | G05D 1/0061 |
| 2021/0300401 A1* | 9/2021 | Hashimoto | G06V 20/58 |
| 2021/0339770 A1* | 11/2021 | Tamori | B60W 30/143 |
| 2022/0063677 A1* | 3/2022 | Sekine | B60W 40/08 |
| 2022/0234607 A1* | 7/2022 | Hata | B60W 60/001 |
| 2022/0324457 A1* | 10/2022 | Arora | B60W 40/08 |

FOREIGN PATENT DOCUMENTS

| | | |
|---|---|---|
| JP | 2017-220070 A | 12/2017 |
| JP | 2018-055154 A | 4/2018 |
| JP | 2020-019392 A | 2/2020 |
| JP | 2021-046036 A | 3/2021 |

\* cited by examiner

APPARATUS AND METHOD FOR STEERING ADJUSTMENT

FIELD

The present disclosure relates to an apparatus and method for adjusting steering of a vehicle.

BACKGROUND

A known apparatus for steering adjustment generates a reaction force with respect to an operation of a steering wheel in accordance with the situation of a vehicle for ensuring a suitable operation of a driver on the steering wheel to designate a steering amount of the vehicle in accordance with the situation of the vehicle.

For example, an apparatus for steering force correction described in Japanese Unexamined Patent Publication No. 9-066853 calculates a hazard level indicating a possibility of approaching another vehicle to own vehicle in the future by using the speed and interval of another vehicle traveling in an adjoining lane. For example, when the hazard level is determined to be smaller by steering to the right in comparison to proceeding straight, this apparatus decreases the steering force to the right than that to the left.

SUMMARY

When a driver operates a steering wheel over a predetermined threshold during autonomous driving where a travel controller autonomously controls travel of a vehicle, the travel controller gives precedence to the control amount of a steering direction and steering amount based on operation of the driver over a control amount determined by the autonomous driving. In this case, when the driver does not suitably recognize the situation in the steering direction corresponding to operation of the steering wheel (for example, the position of the other vehicle traveling in the lane adjoining the steering direction), the driving safety after steering may not be sufficiently secured.

It is an object of the present disclosure to provide an apparatus for adjusting steering that inhibits a steering operation of a driver toward a direction in which the driver does not sufficiently recognize a situation during autonomous driving.

The gist of the present disclosure is as follows:

(1) An apparatus for steering adjustment comprising a processor configured to:
  detect a gaze direction of a driver of a vehicle from a facial image in which a face of the driver is represented, and
  during autonomous driving in which steering of the vehicle is autonomously controlled, when an operation by the driver on a steering wheel accepting operations by the driver for designating a steering direction and a steering amount of the vehicle is detected, determine whether the gaze direction of the driver corresponds to the steering direction in the operation of the driver and adjust a reaction force with respect to the operation on the steering wheel smaller when the gaze direction corresponds to the steering direction than when the gaze direction does not correspond to the steering direction.

(2) The apparatus according to (1) above, wherein the processor, in the adjustment of the reaction force, adjusts the reaction force with respect to the operation of the steering wheel during autonomous driving to a predetermined value and adjusts the reaction force larger than the reaction force during the autonomous driving when the gaze direction does not correspond to the steering direction.

(3) The apparatus according to (1) or (2) above, wherein the processor is further configured to determine a hazard level indicating a possibility of a hazardous event possibly occurring on the vehicle to proceed in the steering direction based on a relative position from the vehicle to object detected from a surrounding image representing the state of surroundings of the vehicle, and
  the processor, in the adjustment of the reaction force, adjusts the reaction force larger the higher the hazard level.

(4) A method for steering adjustment by an apparatus that can adjust a reaction force with respect to an operation of a steering wheel accepting operations by a driver of a vehicle for designating a steering direction and a steering amount, comprising:
  detecting a gaze direction of the driver of the vehicle from a facial image in which a face of the driver is represented, and
  during autonomous driving in which steering of the vehicle is autonomously controlled, when an operation by the driver on the steering wheel is detected, determining whether the gaze direction of the driver corresponds to the steering direction in the operation of the driver and adjusting a reaction force with respect to an operation of the steering wheel smaller than when the gaze direction does not correspond to the steering direction.

(5) A non-transitory computer-readable medium having a computer program for steering adjustment stored therein, the computer program causing a computer mounted on a vehicle to execute a process comprising:
  detecting a gaze direction of a driver of the vehicle from a facial image in which a face of the driver is represented, and
  during autonomous driving in which steering of the vehicle is autonomously controlled, when an operation by the driver on the steering wheel accepting operations by the driver of the vehicle for designating a steering direction and a steering amount is detected, determining whether the gaze direction of the driver corresponds to the steering direction in the operation of the driver and adjusting a reaction force with respect to the operation on the steering wheel smaller when the gaze direction corresponds to the steering direction than when the gaze direction does not correspond to the steering direction.

According to the apparatus according to the present disclosure, it is possible to inhibit a steering operation of a driver toward a direction in which the driver does not sufficiently recognize a situation during autonomous driving.

DESCRIPTION OF EMBODIMENTS

An apparatus for steering adjustment that inhibit a steering operation of the driver toward a direction in which the driver does not sufficiently recognize a situation during autonomous driving will now be described in detail. The apparatus detects a gaze direction of the driver of the vehicle from a facial image in which a face of the driver is represented. The apparatus detects an operation of the driver on a steering operation acceptor during autonomous driving in which steering of the vehicle is autonomously controlled and, when detecting it, determines whether the gaze direction of the driver corresponds to the steering direction in the operation of the driver. The steering operation acceptor is a device accepting operations by the driver for designating a steering direction and a steering amount of a vehicle, such as a steering wheel. The apparatus adjusts a reaction force with respect to the operation on the steering operation acceptor smaller when the gaze direction corresponds to the steering direction than when the gaze direction does not correspond to the steering direction.

Figure 1:
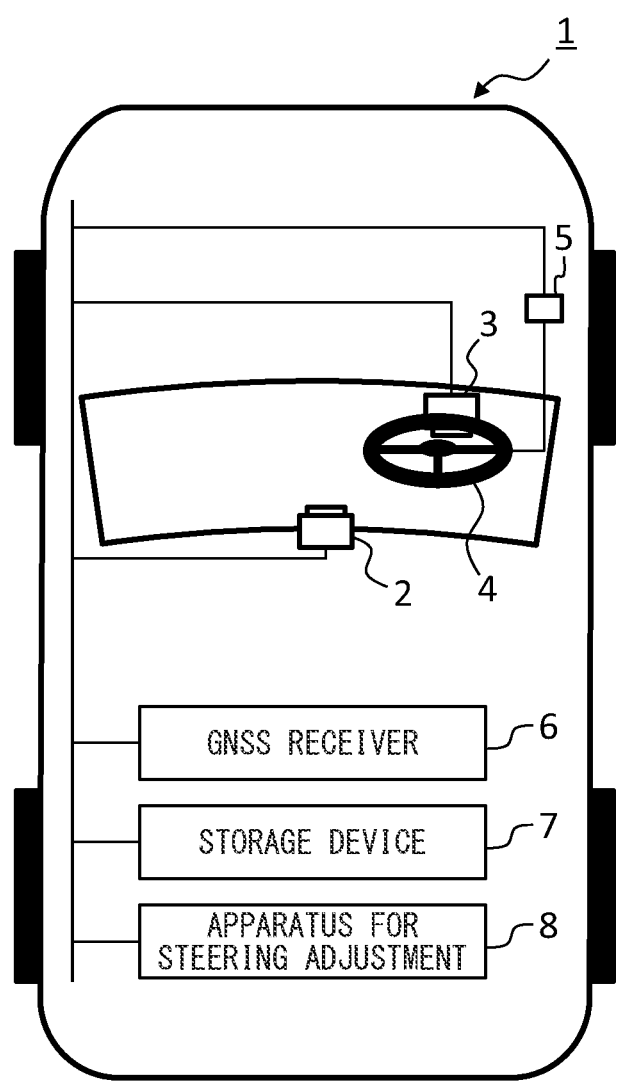
FIG. 1 schematically illustrates the configuration of a vehicle equipped with an apparatus for steering adjustment.

FIG. 1 schematically illustrates the configuration of a vehicle equipped with an apparatus for steering adjustment.

The vehicle 1 includes a surrounding camera 2, a driver monitor camera 3, a steering wheel 4, a steering controller 5, a GNSS receiver 6, a storage device 7, and an apparatus 8 for steering adjustment. The surrounding camera 2, the driver monitor camera 3, the steering controller 5, the GNSS receiver 6, and the storage device 7 and the apparatus 8 are connected via an in-vehicle network conforming to a standard, such as a controller area network, so that they can communicate with each other.

The surrounding camera 2 is an example of a surrounding sensor for generating surrounding data representing the situation around the vehicle 1. The surrounding camera 2 includes a two-dimensional detector constructed from an array of optoelectronic transducers, such as CCD or C-MOS, having sensitivity to visible light and a focusing optical system that forms an image of a target region on the two-dimensional detector. The surrounding camera 2 is disposed, for example, in a front and upper area in the interior of the vehicle and oriented forward. The surrounding camera 2 takes pictures of the surroundings of the vehicle 1 through a windshield every predetermined capturing period (e.g., 1/30 to 1/10 seconds) and outputs surrounding images as surrounding data representing the situation in the surroundings of the vehicle 1. The vehicle 1 may alternatively or additionally have, as a surrounding sensor, a sensor other than the surrounding camera 2, for example, a LiDAR (light detection and ranging) sensor which generates as surrounding data a range image whose pixels respectively have values depending on the distances to an object represented in those pixels based on the surrounding state of the vehicle 1.

The driver monitor camera 3 is an example of an interior sensor for generating an output signal representing the situation of the driver of the vehicle. The driver monitor camera 3 has a two-dimensional detector constructed from an array of optoelectronic transducers having sensitivity to infrared light such as a CCD or C-MOS and a focusing optical system that forms an image of a target region on the two-dimensional detector. The driver monitor camera 3 has a light source emitting infrared light. The driver monitor camera 3 is, for example, attached in a front area in the interior of the vehicle and oriented toward the face of the driver seated on the driver's seat. The driver monitor camera emits infrared light to the driver every predetermined capturing period (e.g., 1/30 to 1/10 seconds) and outputs facial images representing the face of the driver as the output signal in time series.

The steering wheel 4 is an example of a steering operation acceptor for accepting operations of the driver for adjusting the steering direction and a steering amount of the vehicle 1. The steering wheel 4 outputs to the steering controller 5 a signal corresponding to an operation by the driver for requesting operation of the steering mechanism for steering the vehicle 1. The operation requesting operation of the steering mechanism is, for example, a turning operation of the steering wheel 4 to the right or to the left. The steering wheel 4 has an actuator for generating the reaction force with respect to an operation of the driver.

The steering wheel 4 may include a steering holding sensor. The steering holding sensor is an example of a sensor equipped in the vehicle 1. The steering holding sensor outputs a steering holding signal corresponding to whether the driver is holding the steering wheel 4 to the steering controller 5. The steering holding sensor is, for example, an electrostatic capacitive sensor provided in the steering wheel 4. The steering holding sensor outputs a signal depending on an electrostatic capacitance, which is different between when the steering wheel 4 is held by the driver and when not held.

The steering controller 5 is an electronic control unit (ECU) having a communication interface, a memory, and a processor. The steering controller 5 is an example of a control device equipped in the vehicle 1, for accepting a signal corresponding to an operation by the driver and a steering holding signal from the steering wheel 4 and sends them to the apparatus 8.

The GNSS receiver 6 receives GNSS signals from GNSS satellites at predetermined intervals and determines the position of the vehicle 1 based on the received GNSS signals. The GNSS receiver 6 outputs a positioning signal indicating the result of determination of the position of the vehicle 1 based on the GNSS signals to the apparatus 8 via the in-vehicle network at predetermined intervals.

The storage device 7, which is an example of a storage unit, includes, for example, a hard disk drive or a nonvolatile semiconductor memory. The storage device 7 contains map data including information on features, such as lane lines, in association with their positions.

The apparatus 8 detects a gaze direction of the driver from a facial image. The apparatus 8 detects an operation of the driver on the steering wheel 4 during autonomous driving and, when detecting it, determines whether the gaze direction of the driver corresponds to the steering direction in the operation of the driver. The apparatus 8 adjusts the reaction force with respect to the operation of the steering wheel 4 smaller when the gaze direction corresponds to the steering direction than when the gaze direction does not correspond to the steering direction.

Figure 2:
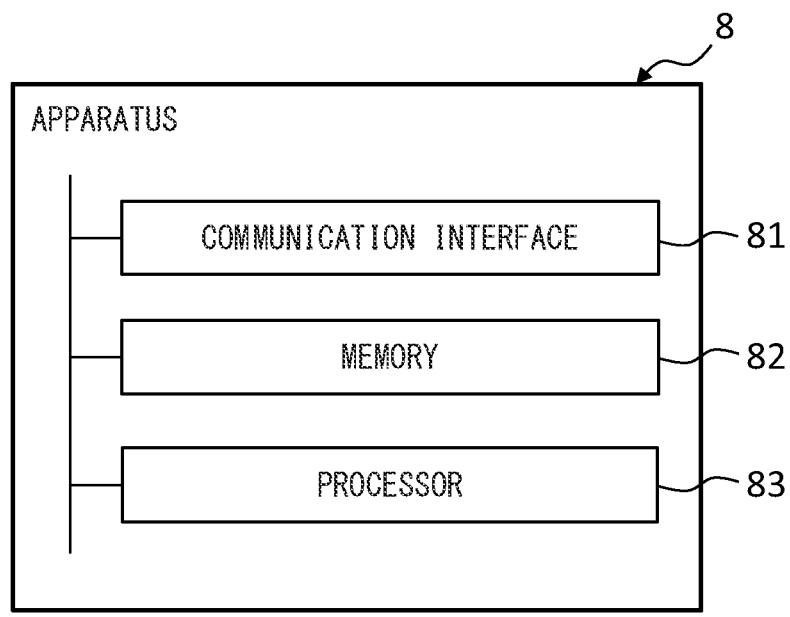
FIG. 2 schematically illustrates the hardware of the apparatus for steering adjustment.

FIG. 2 schematically illustrates the hardware of the apparatus 8 for steering adjustment. The apparatus 8 includes a communication interface 81, a memory 82, and a processor 83.

The communication interface 81, which is an example of a communication unit, includes a communication interface circuit for connecting the apparatus 8 to the in-vehicle network. The communication interface 81 provides the received data to the processor 83. Further, the communication interface 81 outputs data provided from the processor 83 to an external device.

The memory 82 includes volatile and nonvolatile semiconductor memories. The memory 82 contains various types of data used for processing by the processor 83, for example, the value of the reaction force of the steering wheel 4 corresponding to the relationship between the gaze direction of the driver and the steering direction, the operation amount threshold of the steering wheel 4 for determining whether to adjust the steering amount of the vehicle 1 by giving precedence to the control amount based on an operation of the driver during autonomous driving, etc. The memory 82 also stores various application programs, for example, a program for adjusting steering to execute therefor.

The processor 83, which is an example of a control unit, includes one or more processors and a peripheral circuit thereof. The processor 83 may further include another operating circuit, such as a logic-arithmetic unit, an arithmetic unit, or a graphics processing unit.

Figure 3:
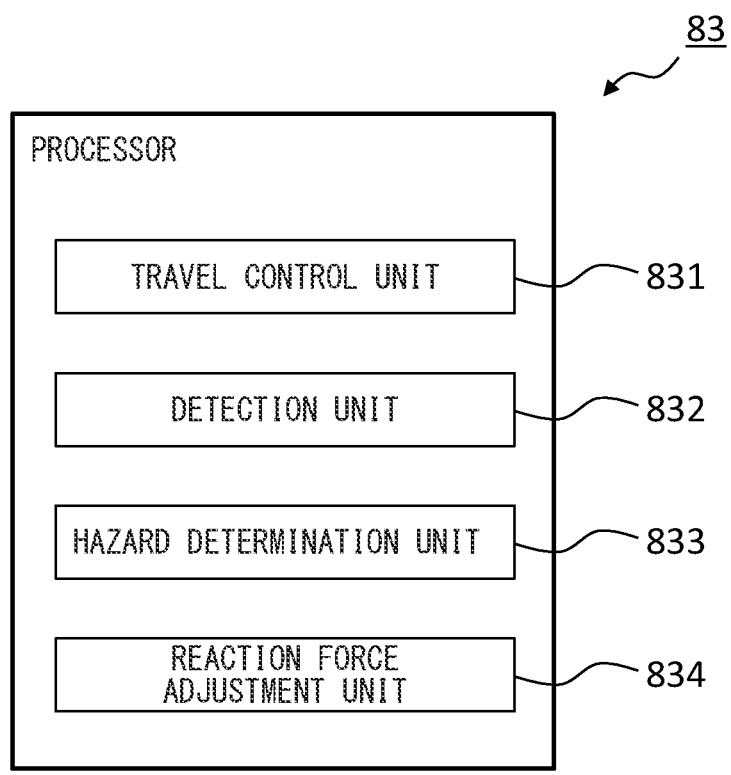
FIG. 3 is a functional block diagram of a processor included in the apparatus.

FIG. 3 is a functional block diagram of the processor 83 included in the apparatus 8.

As its functional blocks, the processor 83 of the apparatus 8 includes a travel control unit 831, a detection unit 832, a hazard determination unit 833, and a reaction force adjustment unit 834. These units included in the processor 83 are functional modules implemented by a computer program executed on the processor 83. The computer program for achieving the functions of the units of the processor 83 may be provided in a form recorded on a computer-readable and portable medium, such as a semiconductor memory, a magnetic recording medium, or an optical recording medium. Alternatively, the units included in the processor 83 may be implemented in the apparatus 8 as separate integrated circuits, microprocessors, or firmware.

The travel control unit 831 controls the steering of the vehicle 1. The travel control unit 831 may control the acceleration and deceleration of the vehicle 1 in addition to steering of the vehicle 1.

The travel control unit 831 receives a surrounding image generated by the surrounding camera 2 through the communication interface 81. The travel control unit 831 detects lane lines in the surroundings of the vehicle 1 by inputting the received surrounding image to a classifier that has been trained in advance so as to detect lane lines. The travel control unit 831 also detects other vehicles in the surroundings of the vehicle 1 by inputting the received surrounding image to a classifier that has been trained in advance so as to detect other vehicles.

The classifier may be, for example, a convolutional neural network (CNN) including a plurality of convolution layers connected in series from the input toward the output. A CNN that has been trained using a plurality of images including lane lines or other vehicles as training data operates as a classifier to detect lane lines or other vehicles from the images.

The travel control unit 831 determines the acceleration rate and the steering amount of the vehicle 1, for example, so that the vehicle 1 suitably travels on the lane based on the detected lane lines and keeps the distance to the detected other vehicle longer than a predetermined distance. The travel control unit 831 outputs a control signal corresponding to the determined acceleration rate and the steering amount to the travel mechanisms (not shown) of the vehicle 1 through the communication interface 81. The travel mechanisms include, for example, a drive source such as an engine or motor for supplying power to the vehicle 1, a brake for decreasing the traveling speed of the vehicle 1, and a steering mechanism for steering the vehicle 1.

The functional blocks corresponding to the travel control unit 831 may also be implemented in a processor different from the apparatus 8. In this case, the apparatus 8 need not have the travel control unit 831.

The detection unit 832 detects the gaze direction of the driver from a facial image in which the face of the driver of the vehicle 1 is represented.

The detection unit 832 acquires a facial image generated by the driver monitor camera 3 through the communication interface 81. The detection unit 832, for example, detects a pupil and a reflected cornea image of the light source by performing template matching between a facial image and respective templates of the pupil and the reflected cornea images of the light source and thereby detects the gaze direction of the driver based on the positional relationship of them.

The hazard determination unit 833 determines a hazard level indicating a possibility of a hazardous event possibly occurring on the vehicle 1 proceeding in the steering direction based on the relative position from the vehicle of an object detected from a surrounding image representing the state of the surroundings of the vehicle 1.

The hazard determination unit 833 detects another vehicle from an image by inputting a series of surrounding images obtained from the surrounding camera 2 within a most recent predetermined time period into the classifier that has been trained in advance so as to detect a vehicle or other detected objects from an image.

The hazard determination unit 833 identifies the orientation of the other vehicle from the vehicle 1 based on the position at which the other vehicle is detected in a surrounding image. The hazard determination unit 833 identifies a travel direction in a lane positioned in the identified orientation of the other vehicle in lane information acquired from the storage device 7 corresponding to its own position indicated in the positioning signal received from the GNSS receiver 6 and estimates the direction of the other vehicle with reference to the vehicle 1. The hazard determination unit 833 estimates the distance to the other vehicle based on the ratio between the size of the region in which the other vehicle is represented in the surrounding image and a reference size on the image of the other vehicle in an estimated orientation at a reference distance, and the actual size of the other vehicle.

The hazard determination unit 833 estimates the relative position of the other vehicle with reference to the vehicle 1 based on the orientation and the distance from the vehicle 1 to the other vehicle respectively detected from the series of surrounding images obtained by the surrounding camera 2 within the most recent predetermined time period and the respective positions of the vehicle 1 when the series of surrounding images were generated.

The hazard determination unit 833 estimates the relative speed of the other vehicle in the time interval corresponding to the points of time when a pair of surrounding images among a series of the surrounding images were generated by dividing the distance of the relative positions of the other vehicle in the pair of surrounding images by the time interval corresponding to the points of time when the pair of surrounding images were generated. The reference distance, the reference size on the image and the actual size of the detected other vehicle may be, for example, stored in advance in the memory 82.

Based on the estimated relative position and relative speed of the other vehicle, the hazard determination unit 833 calculates the hazard level indicating the possibility of a hazardous event possibly occurring on proceeding to each of the right side and left side of the current travel direction of the vehicle 1.

For example, the hazard determination unit 833 may calculate the hazard level in the case of proceeding to one side of the left and right of the vehicle 1 by applying the interval to the other vehicle and the relative speed of that other vehicle detected at one side to an equation stored in advance in the memory 82.

The equation for calculating the hazard level may be, for example, devised so that the hazard level becomes higher the shorter the interval to the other vehicle.

When the relative speed of the other vehicle positioned at the front of the vehicle 1 is positive, the interval between the vehicle 1 and the other vehicle becomes longer along with the elapse of time, while when the relative speed is negative, it becomes shorter. Therefore, the equation for calculating the hazard level may be devised so that the hazard level becomes higher the greater the negative value of the relative speed with the other vehicle.

When detecting operation by the driver of the steering wheel 4 during autonomous driving, the reaction force adjustment unit 834 adjusts the reaction force with respect to an operation of the steering wheel 4 upon the gaze direction of driver corresponding to the steering direction at the operation of the driver.

Figure 4:
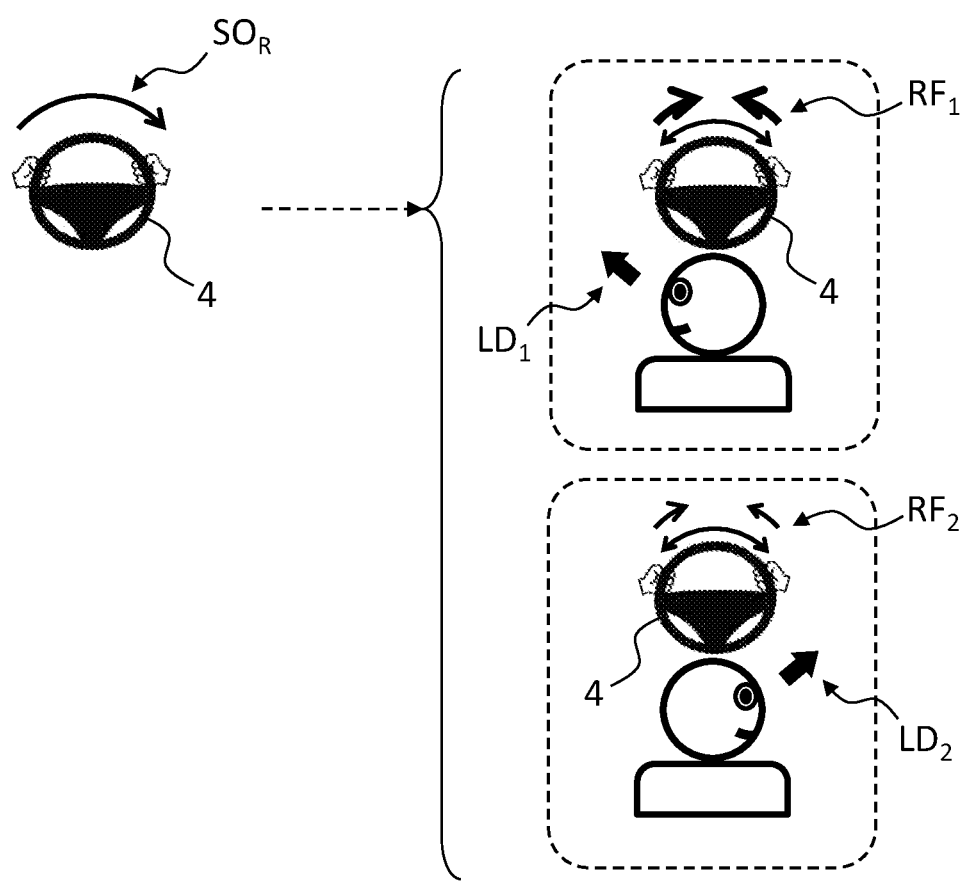
FIG. 4 is a diagram for explaining an example of a reaction force adjustment.

FIG. 4 is a diagram for explaining an example of a reaction force adjustment.

The reaction force adjustment unit 834 first determines whether an operation of the steering wheel 4 by the driver of the vehicle 1 has been detected during autonomous driving.

The reaction force adjustment unit 834 may determine whether the vehicle 1 is under autonomous driving by referring to the operating state of the travel control unit 831. The reaction force adjustment unit 834 may also determine whether an operation of the steering wheel 4 has been detected based on a signal received from the steering controller 5 through the communication interface 81. The reaction force adjustment unit 834 may also detect operation of the steering wheel 4 when the amount of operation based on a signal received from the steering controller 5 is higher than an operation threshold stored in the memory 82. In the example of FIG. 4, the reaction force adjustment unit 834 detects a right direction steering operation $SO_R$.

When an operation by the driver on the steering wheel 4 is detected during autonomous driving, the reaction force adjustment unit 834 determines whether the gaze direction of the driver obtained from the detection unit 832 corresponds to the steering direction of the driver detected from a signal received from the steering controller 5. The reaction force adjustment unit 834 may also determine that the gaze direction corresponds to the steering direction when both the gaze direction and the steering direction are in the same orientation with respect to the traveling direction of the vehicle 1 (right or left). The reaction force adjustment unit 834 may determine that the gaze direction corresponds to the steering direction when the angle formed between the gaze direction and the direction of advance of the vehicle 1 in the case of steering in accordance with a steering amount based on a signal received from the steering controller 5 is smaller than a predetermined angle threshold value.

The reaction force adjustment unit 834 adjusts the reaction force with respect to the operation of the steering wheel 4 smaller when the gaze direction corresponds to the steering direction than when the gaze direction does not correspond to the steering direction.

In the example of FIG. 4, the gaze direction $LD_1$ of the driver in the left direction does not correspond to the right direction steering operation $SO_R$. On the other hand, the gaze direction $LD_2$ of the driver in the right direction corresponds to the right direction steering operation $SO_R$. The reaction force adjustment unit 834 adjusts the reaction force $RF_2$ when the gaze direction $LD_2$ is detected to become smaller than the reaction force $RF_1$ when the gaze direction $LD_1$ is detected.

For example, when autonomous driving is started, the reaction force adjustment unit 834 sends a control signal to the steering controller 5 so that the value indicating the reaction force with respect to an operation of the steering wheel 4 becomes a first value (for example 100). When operation of the steering wheel 4 is detected during autonomous driving, the reaction force adjustment unit 834 sends a control signal to the steering controller 5 so that a second value indicating the reaction force with respect to an operation of the steering wheel 4 when the gaze direction corresponds to the steering direction becomes a value (for example, 80) smaller than a third value (for example, 120) indicating the reaction force for the case that the gaze direction does not correspond to the steering direction.

The third value may also be a value equal to or smaller than the first value (for example, 80). In this case, the reaction force adjustment unit 834 sends a control signal to the steering controller 5 so that the second value becomes a value further smaller than the third value equal to or smaller than the first value (for example, 60).

The reaction force adjustment unit 834 may also adjust the reaction force so that the reaction force when the gaze direction does not correspond to the steering direction becomes larger than the reaction force during autonomous driving. According to this adjustment, the apparatus 8 can inhibit a steering operation when the driver is not properly directing a gaze direction.

For example, when an operation of the steering wheel 4 is detected during autonomous driving, the reaction force adjustment unit 834 sends a control signal to the steering controller 5 so that the value indicating the reaction force for the case that the gaze direction does not correspond to the steering direction becomes the above-mentioned third value.

The second value may be a value equal to or larger than the first value (for example, 120). In this case, the reaction force adjustment unit 834 sends a control signal to the steering controller 5 so that the third value becomes a value further larger than the second value of a value equal to or larger than the first value (for example, 140).

The reaction force adjustment unit 834 may also adjust the reaction force so that the reaction force becomes larger the higher the hazard level. According to this adjustment, the apparatus 8 can inhibit a steering operation in a direction with a high hazard level.

For example, the reaction force adjustment unit 834 acquires a hazard level in the case of proceeding in the steering direction from the hazard identification unit 833. The reaction force adjustment unit 834 sends a control signal to the steering controller 5 so that the reaction force becomes larger the higher the hazard level.

Figure 5:
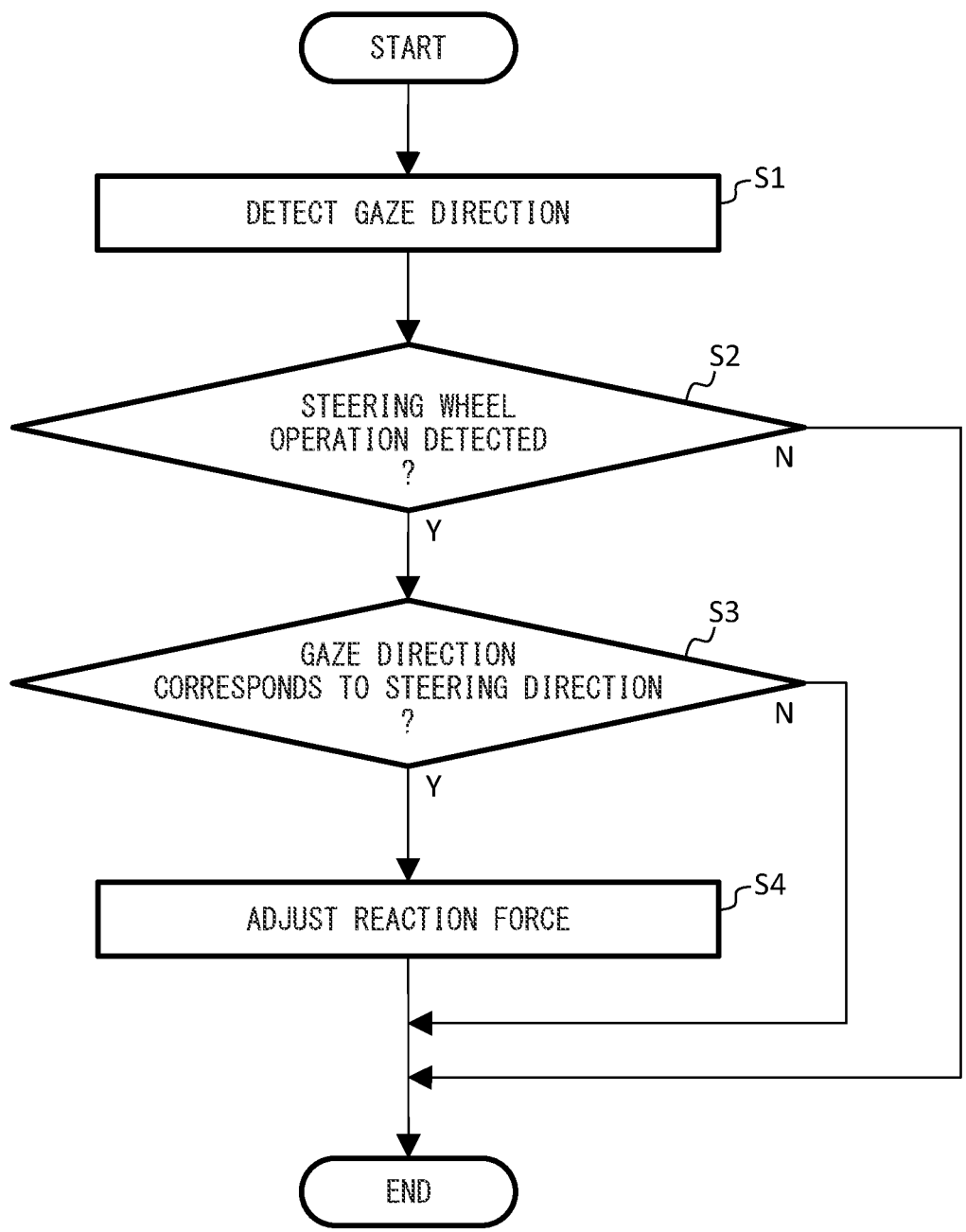
FIG. 5 is a flowchart of a process for steering adjustment.

FIG. 5 is a flowchart of a process for steering adjustment. The processor 83 of the apparatus 8 repeatedly performs the steering adjustment processing described below at predetermined intervals while the vehicle 1 is under autonomous driving.

First, the detection unit 832 of the processor 83 of the apparatus 8 detects a gaze direction of the driver of the vehicle 1 from a facial image generated by the driver monitor camera 3 (step S1).

The reaction force adjustment unit 834 of the processor 83 determines whether an operation by the driver of the vehicle 1 on the steering wheel 4 is detected (step S2). When an operation on the steering wheel 4 has not been detected (step S2: N), the reaction force adjustment unit 834 terminates the process for steering adjustment.

When an operation on the steering wheel 4 has been detected (step S2: Y), the reaction force adjustment unit 834 determines whether the gaze direction of the driver corresponds to the steering direction of the driver detected from a signal received from the steering controller 5 (step S3). When the gaze direction does not correspond to the steering direction (step S3: N), the reaction force adjustment unit 834 terminates the process for steering adjustment.

When the gaze direction corresponds to the steering direction (step S3: Y), the reaction force adjustment unit 834 adjusts the reaction force (step S4) the reaction force with respect to an operation of the steering wheel 4 smaller than the reaction force for the case that the gaze direction does not correspond to the steering direction and terminates the process for steering adjustment.

The apparatus 8 can inhibit a steering operation of the driver toward a direction in which the driver does not sufficiently recognize a situation during autonomous driving by performing the process for steering adjustment as described above.

Note that those skilled in the art can apply various changes, substitutions, and modifications without departing from the spirit and scope of the present disclosure.

What is claimed is:

1. An apparatus for steering adjustment comprising a processor configured to:
   detect a gaze direction of a driver of a vehicle from a facial image in which a face of the driver is represented, and
   during autonomous driving in which steering of the vehicle is autonomously controlled, when an operation by the driver on a steering wheel accepting operations by the driver for designating a steering direction and a steering amount of the vehicle is detected, determine whether the gaze direction of the driver corresponds to the steering direction in the operation of the driver and adjust a reaction force with respect to the operation on the steering wheel smaller when the gaze direction corresponds to the steering direction than when the gaze direction does not correspond to the steering direction.

2. The apparatus according to claim 1, wherein the processor, in the adjustment of the reaction force, adjusts the reaction force with respect to the operation of the steering wheel during autonomous driving to a predetermined value and adjusts the reaction force larger than the reaction force during the autonomous driving when the gaze direction does not correspond to the steering direction.

3. The apparatus according to claim 1, wherein the processor is further configured to determine a hazard level indicating a possibility of a hazardous event possibly occurring on the vehicle to proceed in the steering direction based on a relative position from the vehicle of an object detected from a surrounding image representing the state of surroundings of the vehicle, and
   the processor, in the adjustment of the reaction force, adjusts the reaction force larger the higher the hazard level.

4. A method for steering adjustment by an apparatus that can adjust a reaction force with respect to an operation of a steering wheel accepting operations by a driver of a vehicle for designating a steering direction and a steering amount, comprising:
   detecting a gaze direction of the driver of the vehicle from a facial image in which a face of the driver is represented, and
   during autonomous driving in which steering of the vehicle is autonomously controlled, when an operation by the driver on the steering wheel is detected, determining whether the gaze direction of the driver corresponds to the steering direction in the operation of the driver and adjusting a reaction force with respect to the operation on the steering wheel smaller when the gaze direction corresponds to the steering direction than when the gaze direction does not correspond to the steering direction.

5. A non-transitory computer-readable medium having a computer program for steering adjustment stored therein, the computer program causing a computer mounted on a vehicle to execute a process comprising:
   detecting a gaze direction of a driver of the vehicle from a facial image in which a face of the driver is represented, and
   during autonomous driving in which steering of the vehicle is autonomously controlled, when an operation by the driver on the steering wheel accepting operations by the driver of the vehicle for designating a steering direction and a steering amount is detected, determining whether the gaze direction of the driver corresponds to the steering direction in the operation of the driver and adjusting a reaction force with respect to the operation on the steering wheel smaller when the gaze direction corresponds to the steering direction than when the gaze direction does not correspond to the steering direction.

* * * * *